(12) United States Patent
Bayer et al.

(10) Patent No.: US 7,121,974 B2
(45) Date of Patent: Oct. 17, 2006

(54) TRANSMISSION, IN PARTICULAR EPICYCLIC TRANSMISSION

(75) Inventors: Thomas Bayer, Igersheim (DE); Christof Old, Bad Mergentheim (DE)

(73) Assignee: Wittenstein AG, Igersheim (DE)

( * ) Notice: Subject to any disclaimer, the term of this patent is extended or adjusted under 35 U.S.C. 154(b) by 0 days.

(21) Appl. No.: 11/302,851

(22) Filed: Dec. 13, 2005

(65) Prior Publication Data

US 2006/0094563 A1 May 4, 2006

Related U.S. Application Data

(63) Continuation of application No. 10/475,408, filed as application No. PCT/EP02/01318 on Feb. 8, 2002.

(30) Foreign Application Priority Data

Apr. 23, 2001 (DE) .................. 101 19 998
May 22, 2001 (DE) .................. 101 25 148

(51) Int. Cl.
*F16H 57/08* (2006.01)

(52) U.S. Cl. ................................. 475/331

(58) Field of Classification Search ........... 475/149, 475/150, 331
See application file for complete search history.

(56) References Cited

U.S. PATENT DOCUMENTS 6,282,895 B1 * 9/2001 Johansson et al. ............ 60/524
6,315,086 B1 * 11/2001 Schmitt et al. ............. 188/72.7
6,824,495 B1 * 11/2004 Kirschner .................. 475/348

FOREIGN PATENT DOCUMENTS

JP        2003-189513      * 12/2001

* cited by examiner

*Primary Examiner*—Ha Ho
(74) *Attorney, Agent, or Firm*—Bachman & LaPointe, P.C.

(57) ABSTRACT

A drive, particularly a planetary drive, comprising a drive shaft and at least one driven shaft which are connected by at least one element. The drive shaft and the driven shaft are mounted opposite the housing parts by bearings. The drive is characterized in that the annular space for receiving at least two sealing elements which are disposed consecutively is formed between the housing parts and the drive shaft and/or driven shaft.

5 Claims, 4 Drawing Sheets

TRANSMISSION, IN PARTICULAR EPICYCLIC TRANSMISSION

CROSS REFERENCE TO RELATED APPLICATION

This application is a divisional application of U.S. patent application Ser. No. 10/475,408 filed Oct. 22, 2003 entitled TRANSMISSION OR EPICYCLE TRANSMISSION, by Thomas Bayer.

BACKGROUND OF THE INVENTION

The present invention relates to a transmission or an epicyclic transmission, with a drive shaft and with at least one output shaft and with at least one output shaft which are connected via at least one element, the drive shaft and output shaft being mounted with respect to at least one housing part via bearings.

Epicyclic transmissions of this type are known and customary on the market in many different forms and versions. In this context, the elements may be positive gearwheels, nonpositive belts, ropes, chains or crank-type or slider-type mechanism elements. The present invention will not be restricted to these.

According to the prior art, most epicyclic transmissions are sealed off by means of an end-face sealing element, in order to prevent lubricants, in particular transmission oil, from running out in the event of wear of the sealing ring, in particular of a shaft sealing ring.

Furthermore, one disadvantage of conventional epicyclic transmissions is that these are subject, in particular, to high wear, and, as a result, abrasion is distributed in the transmission and damages the surfaces of the elements.

Another disadvantage is that conventional epicyclic transmissions are complicated to produce and assemble.

FR 2 622 946 describes a differential, in which a flange is provided on the output shaft, in particular its housing, a sleeve being seated on the output shaft, two sealing elements being provided in an annular space between the end-face flange and the sleeve.

U.S. Pat. No. 4,817,846 discloses a seal arrangement between a housing part and a shaft, a sleeve being seated on the shaft. A lamella-like sealing flange, which contains a plurality of seals, is screwed to the housing part on the end face.

U.S. Pat. No. 5,476,582 discloses a differential housing, in which magnetically acting filter elements are arranged.

U.S. Pat. No. 6,105,464 discloses a transmission in the housing of which is provided a magnet.

The object on which the present invention is based is to provide a transmission, in particular an epicyclic transmission of the type initially mentioned, which eliminates the disadvantages mentioned and by means of which the useful life is to be increased in a highly cost-effective and efficient way. Furthermore, the manufacturing times and assembly costs of a transmission of this type are to be reduced. Moreover, a maintenance interval of the components, also, in particular, of the seals, is to be capable of being influenced.

SUMMARY OF THE INVENTION

The foregoing object is achieved by the present invention by providing a transmission in particular an epicyclic transmission, with a drive shaft and with at least one output shaft which are connected via at least one element, the drive shaft and output shaft being mounted with respect to at least one housing part via bearings, characterized in that at least one annular space for the reception of at least two sealing elements capable of being inserted axially one behind the other is formed between the at least one housing part and the drive and/or output shaft.

In the present invention, a transmission, in particular an epicyclic transmission, is provided, in which an annular space between an inner surface area of housing parts and the shaft itself or a tension ring, said annular space preferably being of elongate design, is formed, in particular, near the bearings of the drive and/or output shaft. Preferably, the annular space has a depth which corresponds approximately to a width of at least two sealing elements, in particular of a shaft sealing ring.

The annular space may preferably receive two sealing elements, in particular two shaft sealing rings, arranged Axially next to one another. In this case, one of the two shaft sealing rings is inactive, that is to say its sealing lip does not bear against either the drive and/or output shaft or its tension ring. Only when the active tension ring undergoes a certain amount of wear, so that oil or lubricant emerges via leakages, is this detected by a corresponding sensor, so that the inactive shaft sealing ring is then activated and its sealing lip is brought to bear against the shafts or tension rings to be sealed off. This may take place automatically and be detected by a system. Under normal circumstances, during operation, the entire system in which a transmission of this type is integrated would have to be stopped immediately after detection of the leakage and the shaft sealing ring would have to be exchanged. This would incur high costs, which is undesirable.

In order to avoid this, in the present invention there is provision for using a second inactive ring, with an annular space specially provided in front of it, as a second securing ring. A corresponding control, not illustrated, knows when a sealing ring is spent due to wear, so that a second securing ring can be activated. Thus, during the next maintenance interval, the damaged first sealing ring can then be exchanged, without complete production or the operation of the epicyclic transmissions having to be stopped temporarily for this purpose merely in order to change the one damaged sealing ring.

Furthermore, it has proved advantageous to design a housing of the epicyclic transmission in three parts, the output shaft being mounted in the first housing part by means of an end-face rotary disk-type carrier, in which preferably the bolts for receiving the planet wheels are pressed. For pressing in, it has proved advantageous either to design the bolt as a hollow element or to provide at least partially a reception orifice in the rotary disk-type carrier with a vent orifice. Moreover, it has proved advantageous to design the bolt element at least partially as a hollow element and to provide, in the region of the planet wheels, a plurality of radial bores which serve for the supply of lubricants for the needle bearing of the planet wheel carrier.

It is also advantageous, in the present invention, that, in the region of the spur wheels, planet wheels and toothing of the middle housing part, a plurality of permanent magnets preferably peripherally arranged radially are either arranged on the end face in the last housing part or may also be arranged, near the toothing, on an inner surface area of the middle housing part. These permanent magnets serve permanently, and irrespective of the position of the epicyclic transmission, for immediately picking up abrasion or ferritic material caused by abrasion during operation, without this running through the individual elements during operation.

Owing to the permanent magnets peripherally arranged radially, the epicyclic transmission is independent of its installation position.

It has also proved advantageous to assign to the drive shaft, in particular its rotary disk-type carrier, at least one permanent magnet which is inserted into the latter in its end face centrically to the mid-axis, so that a trough as a chip collecting space for chip abrasion, ferritic material, etc. is formed between an end face of the rotary disk-type carrier and the permanent magnet.

Inserting the permanent magnet centrically into the rotary disk-type carrier on the end face ensures that slight unbalances of the output shaft occur and, at the same time, ferritic material, particularly near the planet wheels which are in engagement with the spur wheel, is picked up by the permanent magnet. Abrasion is thereby picked up or separated off directly in the toothed flank engagement region between spur wheel and planet wheels, so that, consequently, the abrasion does not damage any other elements.

A further advantage in the present invention is that, owing to the housing designed in three parts, a toothing for the planet wheels can be produced within the middle housing part directly from the latter, for example by broaching. As a result, for example, the middle housing part can be produced from a material especially suitable for the toothing. This can then subsequently be connected to the first housing part. Preferably, the second housing part is welded to the first housing part on the end face firmly and with an exact fit.

BRIEF DESCRIPTION OF THE DRAWINGS

Further advantages, features and details of the invention may be gathered from the following description of preferred exemplary embodiments and with reference to the drawing in which.

DETAILED DESCRIPTION

Figure 1:
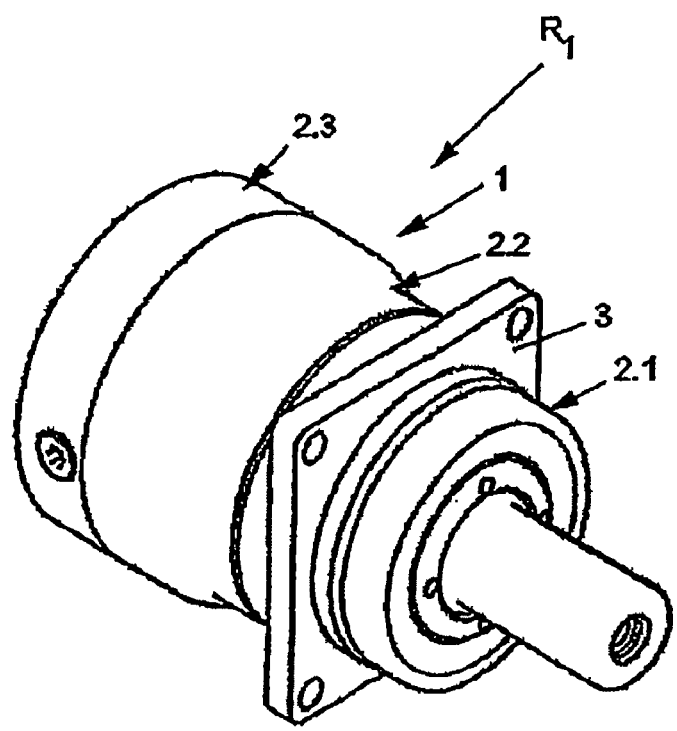
FIG. 1 shows a perspective top view of a transmission, in particular epicyclic transmission, according to the invention.

According to FIG. 1, a transmission $R_1$ according to the invention has a housing 1 which is preferably subdivided into three housing parts 2.1, 2.2, 2.3. The first housing part 2.1 is provided with a flange 3 for fixing the transmission $R_1$ to any desired drive element or the like.

Figure 2:
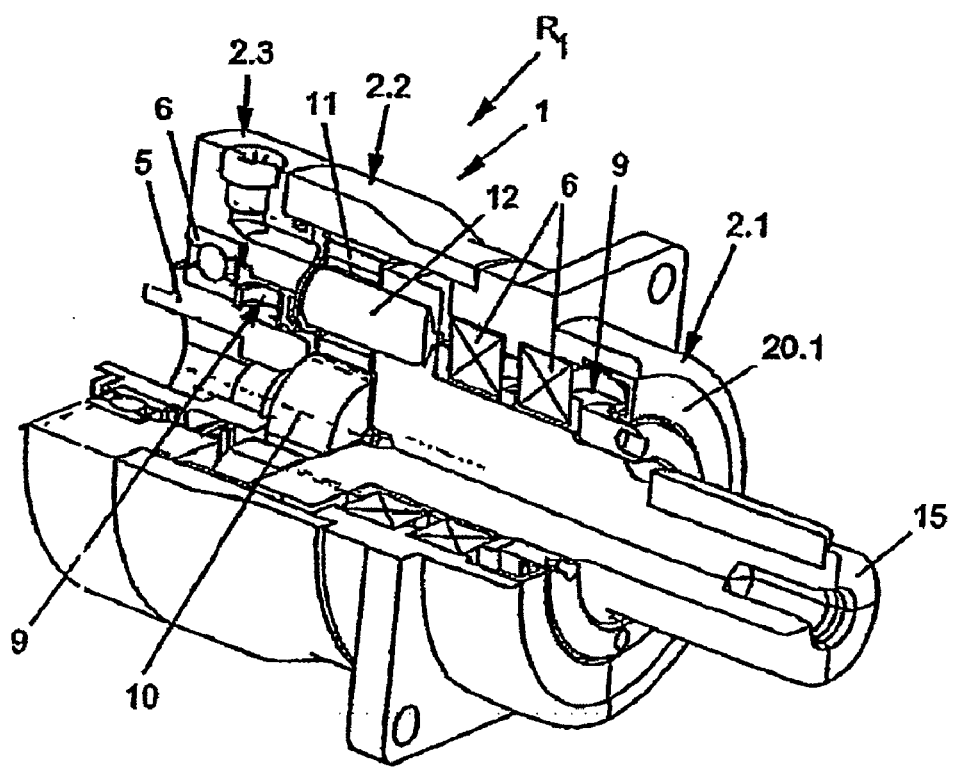
FIG. 2 shows a partially cut away perspective view of the epicyclic transmission according to FIG. 1.

A drive shaft 5 projects into the housing part 2.3 (see also FIG. 2) and is mounted rotatably with respect to the housing part 2.3 via at least one bearing 6. Within the bearings 6, the drive shaft 5 is provided with a step 7, an annular space 9 being formed between the step 7 and an inner surface area 8.

Furthermore, the drive shaft 5 has seated on it a spur wheel 10 which preferably meshes with three planet wheels 11 mounted on bolt elements 12 via needle bearings 13. The bolt elements 12 are pressed into a rotary disk-type carrier 14 of an output shaft 15. A toothing 16 is peripherally arranged radially in the housing part 2.2 on the inside. The housing part 2.2 is preferably designed as a sleeve and has the toothing 16 on the inside. In this case, the planet wheels 11 mesh with the toothing 16 of the housing part 2.2.

Figure 3:
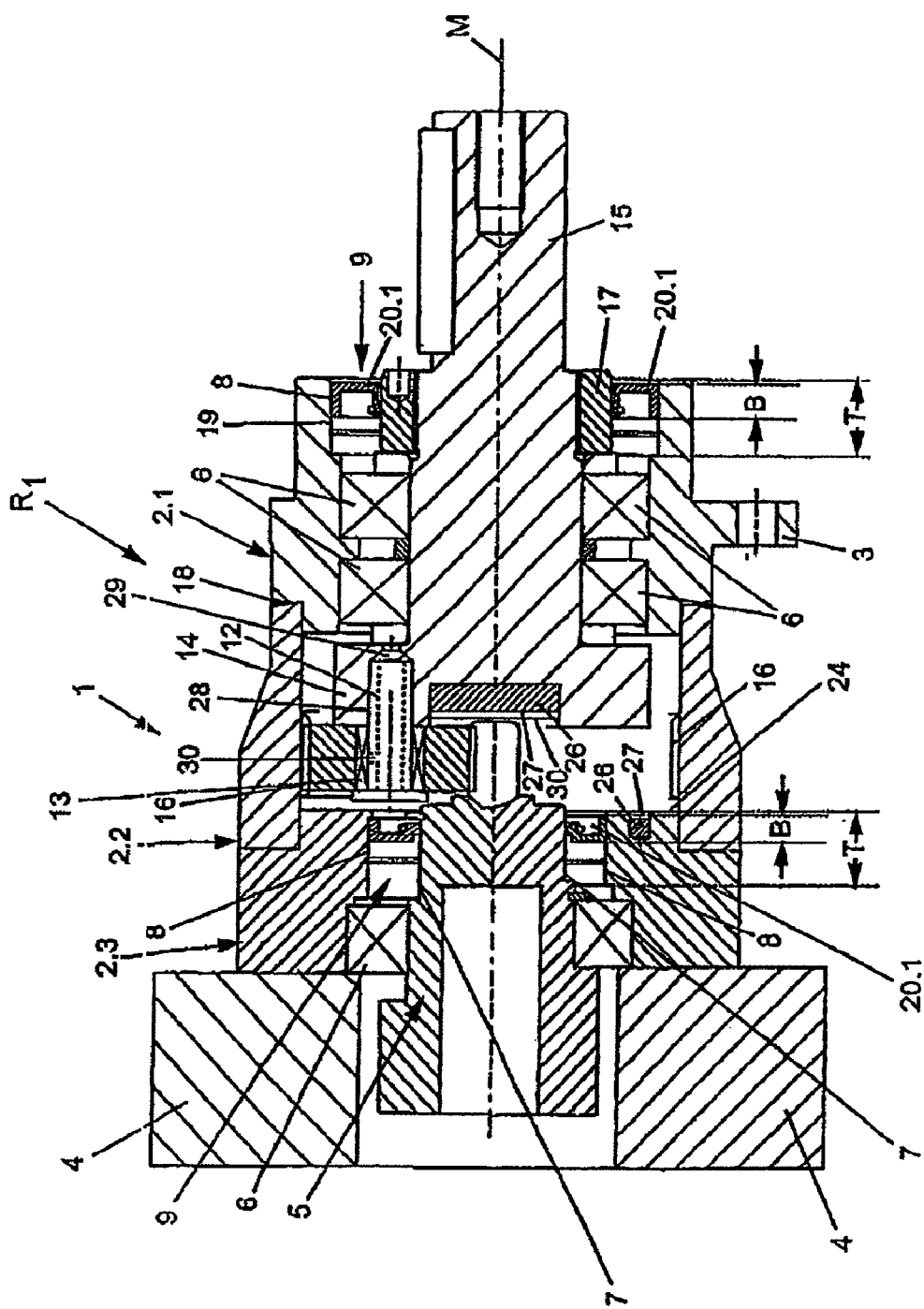
FIG. 3 shows a diagrammatically illustrated longitudinal section through the epicyclic transmission according to FIG. 1.

As may be gathered from the preferred exemplary embodiment according to FIG. 3, the output shaft 15 is mounted rotatably within the housing part 2.1 via two bearings 6 arranged next to one another and is fixed with respect to the housing part 2.2 via a tension ring 17.

The housing part 2.3 is seated releasably on the housing part 2.2 on the end face via steps and flanges which are not numbered specifically here.

Furthermore, it has proved particularly advantageous to connect the housing part 2.2 at the other end firmly to the housing part 2.1 on the end face, in particular via a weld seam 18.

It is thereby possible to ensure that, in particular, the toothing 16 can be produced highly cost-effectively and accurately in the housing part 2.2 itself, for example by broaching.

Furthermore, it is advantageous, in the present invention, that the housing part 2.3 can be connected directly to any desired adapter plate 4. Preferably, the adapter plate 4 overlaps at least the outer ring of the bearing 6, so that the bearing 6 is held in the housing part 2.3. For example, the complete epicyclic transmission, in particular the housing part 2.3, can be fixed releasably and accurately to the adapter plate 4. A further step 19 is formed, adjacently to the bearings 6 of the housing part 2.1, in the end-face region, a further annular space 9 being formed between the output shaft 15 and the step 19 or the inner surface area 8 of the housing part 2.1. In this case, the annular space 9 has a depth T which, in a preferred exemplary embodiment, corresponds to double the width B of a sealing element 20.1.

Figure 5:
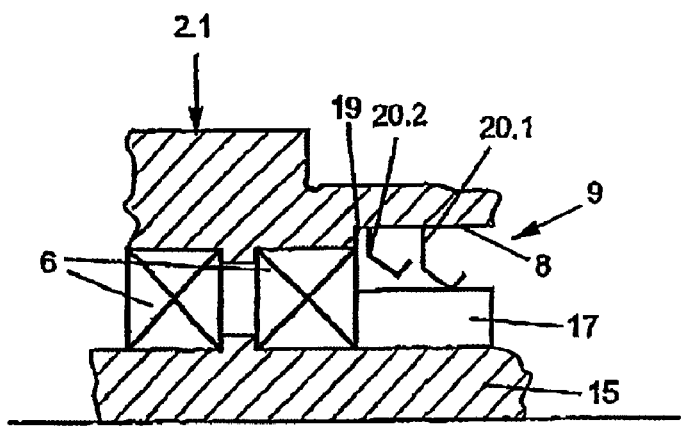
FIG. 5 shows a part longitudinal section, illustrated enlarged, through the transmission according to FIG. 1 in the region of a first housing part.

An essential advantage in the present invention is that, as is not illustrated here, two sealing elements 20.1 can be inserted one into the other, in particular one behind the other, into the annular space 9 over its depth T. In this case, the sealing element 20.1 is the sealing element closing off on the end face, while a second sealing element 20.2 (see FIG. 5) can be inserted into the annular space 9. In this case, the sealing element 20.1 or 20.2 may be used as an additional safety sealing element, which is inactive, in the annular space 9. If one of the two sealing elements 20.1 or 20.2 fails or if one of the two sealing elements 20.1 or 20.2, in particular designed as a shaft sealing ring, allows oil to emerge outward, the leakages are detected via sensor elements, not illustrated specifically here, so that the inactive sealing element is activated via elements or devices, likewise not illustrated here. For this purpose, it is necessary to provide an annular space 9 which receives at least two sealing elements 20.1, 20.2 axially one behind the other.

Figure 6:
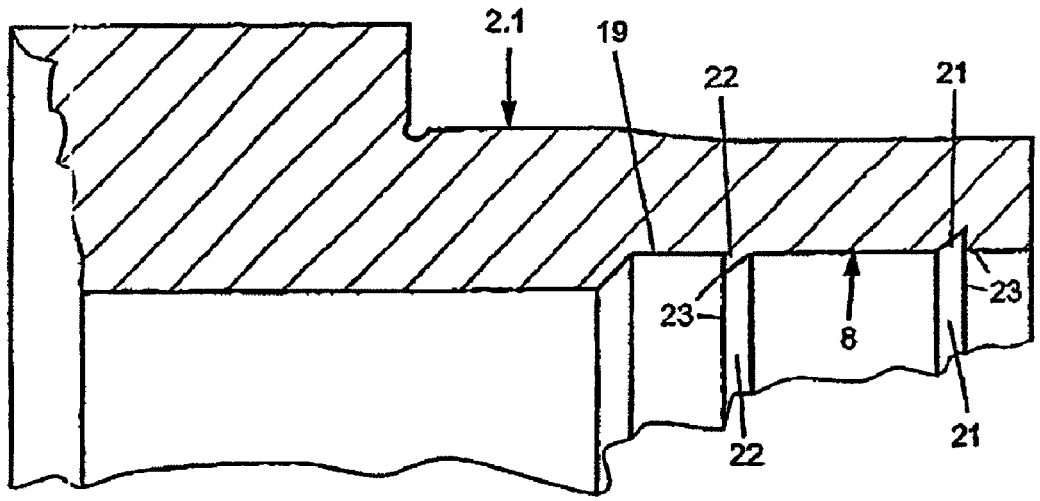
FIG. 6 shows a part, illustrated enlarged, of a part longitudinal section through the first housing part as a further exemplary embodiment.

So that the sealing elements 20.1, 20.2 can be held or anchored firmly in the annular space 9, there are provided on the inner surface area 8 of the housing parts 2.1 and 2.3 (see also FIGS. 3 and 6) preferably peripheral recesses 21 or elevations 22, into which the material of the sealing element 20.1, 20.2 engages, or the elevation 22 is pressed into the material of the sealing element 20.1, 20.2.

Thus, in each case, an edge 23 is formed, which prevents the sealing element 20.1, 20.2 from slipping out of the annular space 9.

In the exemplary embodiment according to FIG. 3, the bearing 6 is arranged, directed outward, on the end face between the drive shaft 5 and the housing part 2.3, since said bearing often has to be exchanged. In order to obtain a sealing off, in particular of the elements 10, 11, 12 and 14 running in lubricant, the annular space 9 for receiving the sealing elements 20.1, 20.2 is formed between the step 7 of the drive shaft 5 and the inner surface area 8 of the housing part 2.3. Here, too, a depth T of the surface area 8 preferably corresponds to double the width B of a sealing element 20.1.

Figure 7:
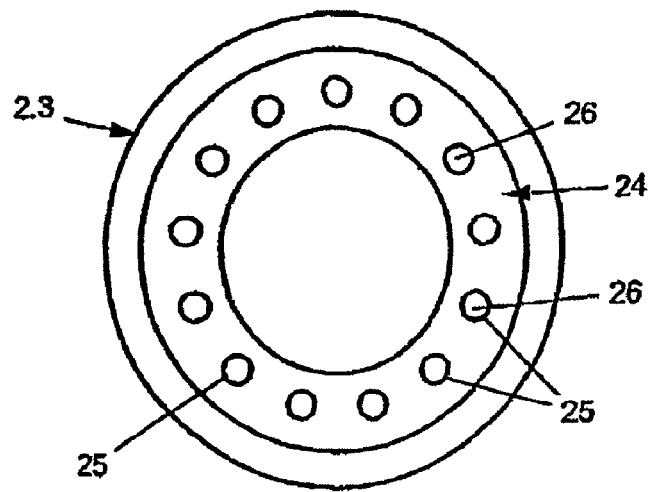
FIG. 7 shows a top view of a third housing part with a plurality of end-face blind holes for the reception of magnets.

It has proved advantageous in the present invention, furthermore, to provide in one end face 24 (see also FIG. 7) a plurality of blind holes 25, in which in each case permanent magnets 26 are radially provided peripherally, as illustrated particularly in FIG. 7. In this case, it may be advantageous that the permanent magnets 26 are inserted, set back, in the blind hole 25, so that a trough 27 is formed between the end face 24 and the permanent magnet 26 in the blind hole 25. Said trough serves for picking up metal chips or ferritic particles which occur as a result of wear during the operation of the elements 10, 11, 12 and 14. Since, in particular, the above-mentioned elements 10, 11, 12 and 14 are subject to wear during operation, the end face 24 having the permanent magnet 26 provided is oriented near to the planet wheels 11 or toward the toothing 16. By a plurality of corresponding permanent magnets 26 being arranged radially in the housing part 2.3, near the planet wheels 11 or the toothing 16, worn ferritic material can thereby be separated off and picked up in a highly effective way. If, for example, the bearing 6 is exchanged by the housing part 2.3 being unflanged from the housing part 2.2, the troughs 27 can be cleaned in a highly accessible way.

Furthermore, a permanent magnet 26 is likewise inserted, set back, into one end face 30 of the output shaft 15, in particular the rotary disk-type carrier 14 of the latter, so that a trough 27 for picking up chips and abrasion is formed between the end face 30 and the permanent magnet 26.

It is important, here, that, for the avoidance of unbalances, the permanent magnet 26 is inserted into the rotary disk-type carrier 14 on the end face so as to be oriented centrically to the mid-axis M.

As a result, in particular, the abrasion of the spur wheel 10 and also of the planet wheels 11 is picked up by the permanent magnet 26, in particular in its trough 27.

It is also to come within the scope of the present invention to arrange the permanent magnets 26, preferably near the toothing 16, radially on the inside in the housing part 2.2 so as to be distributed around the surface area of the latter. The invention will not be restricted to this.

As may be gathered from FIG. 3, furthermore, the bolt element 12 may be produced from solid round material. A vent orifice 29 is then provided at the end of a reception orifice 28 in the rotary disk-type carrier 14 and serves for making it easier to press the bolt elements 12 into the reception orifice 28.

If the bolt element 12 is designed as a hollow shaft, as is indicated by dashes here, the vent orifice 29 may be dispensed with. Then, as is likewise illustrated by dashes, a plurality of radial bores 30 are preferably provided in the bolt element 12 and serve for additional lubrication of the needle bearing 13 for the planet wheels 11.

Figure 4:
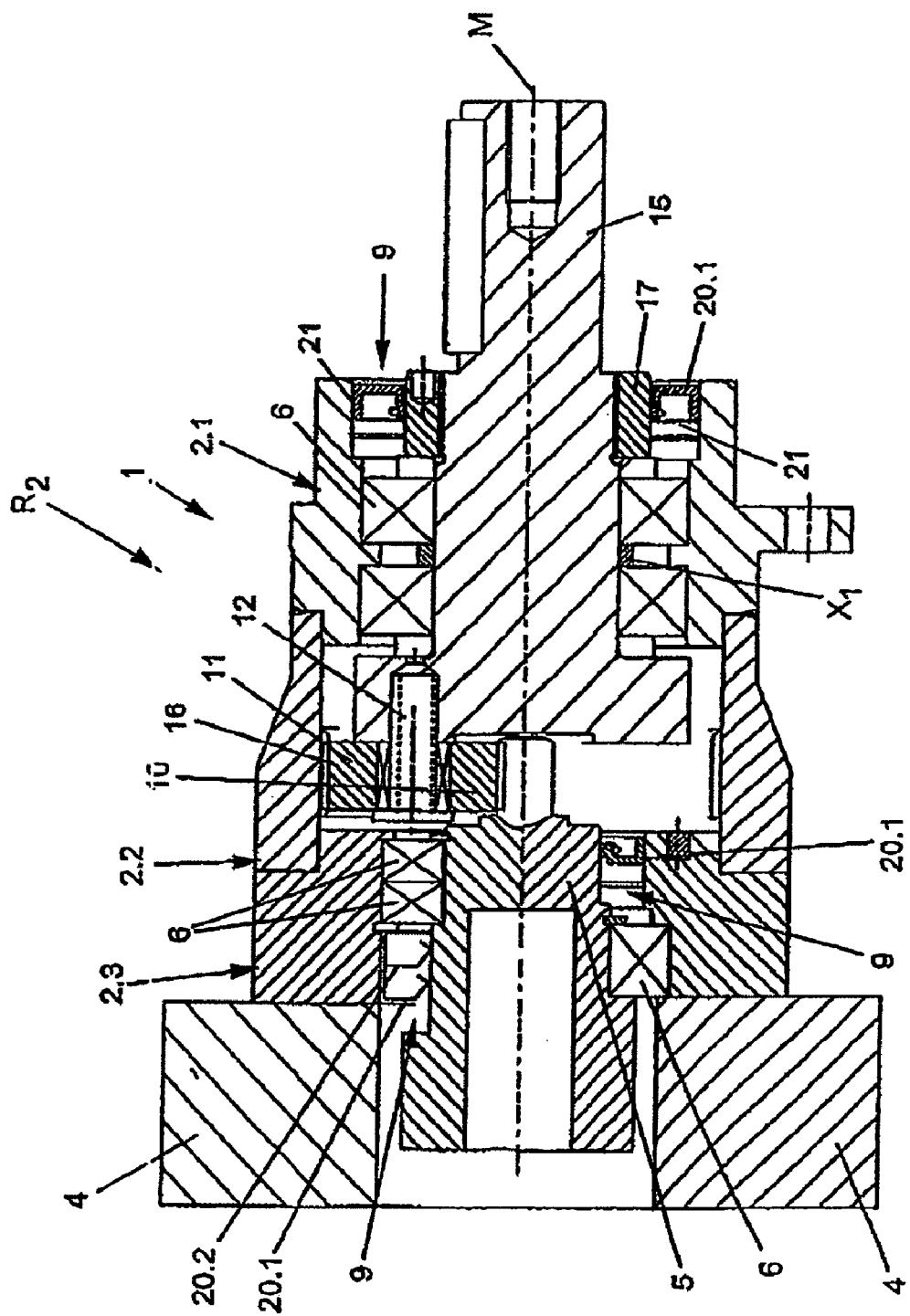
FIG. 4 shows a longitudinal section through a further exemplary embodiment of a further epicyclic transmission according to FIG. 1.

The exemplary embodiment according to FIG. 4 shows a transmission $R_2$ which corresponds essentially to that according to FIG. 3. Here, two possibilities for arranging the sealing elements 20.1, 20.1 are indicated. Either the sealing elements 20.1, 20.2 are inserted into the annular space 9 in the end-face region of the housing part 2.3, as is illustrated in longitudinal section above a mid-axis M, or they are arranged as illustrated below the mid-axis M, this corresponding to the arrangement in the exemplary embodiment according to FIG. 3. In this case, the annular space 9 for receiving the two sealing elements 20.1, 20.2 is formed within the bearing 6. It is thereby likewise possible to influence the use of different bearings 6 so that they run in lubricant or are self-lubricating.

Furthermore, as illustrated, for example, in FIG. 4, the output shaft 15 is mounted via two bearings 6 spaced apart from one another. In this case, a ring $X_1$ is seated between the bearings 6 of the output shaft 15 and spaces the bearings 6 axially apart from one another.

Depending on the width of the ring $X_1$, a play of the output shaft 15 can be set via a shaft nut designed as a tension ring 17. In this case, one of the bearings 6 may come to bear on the end face against the rotary disk-type carrier 14, if appropriate so as to be spaced apart via an additional spacer ring. This is likewise to come within the scope of the present invention.

The invention claimed is:

1. A transmission comprises a drive shaft and at least one output shaft having a rotary disk carrier which is connected by at least one element to the drive shaft, the drive shaft and output shaft are mounted with respect to an at least one housing part on bearings, a plurality of permanent magnets arranged in the at least one housing part, and at least one permanent magnet inserted into an end face of the rotary disk carrier.

2. A transmission according to claim 1, wherein the housing part has an end face, provided with radially arranged blind holes into which the permanent magnets are inserted.

3. The transmission according to claim 2, wherein a trough for the reception of an abrasion material is formed between the permanent magnets and the end face of the housing part.

4. The transmission according to claim 3, wherein the trough for reception of the abrasion material is formed between the end face of the rotary disk carrier and the permanent magnet.

5. The transmission according to claim 1, wherein the permanent magnet is inserted into the end face of the rotary disk carrier axially symmetrically to a longitudinal axis (M) of the output shaft and engages on an end face of the at least one element.

* * * * *